US012124553B2

(12) United States Patent  (10) Patent No.: US 12,124,553 B2
Arana et al.  (45) Date of Patent: Oct. 22, 2024

(54) CONTENT AUTHENTICATION BASED ON INTRINSIC ATTRIBUTES

(71) Applicant: Disney Enterprises, Inc., Burbank, CA (US)

(72) Inventors: Mark Arana, Agoura Hills, CA (US); Miquel Angel Farre Guiu, Bern (CH); Edward C. Drake, Stevenson Ranch, CA (US); Anthony M. Accardo, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 179 days.

(21) Appl. No.: 16/737,810

(22) Filed: Jan. 8, 2020

(65) Prior Publication Data

US 2021/0209196 A1   Jul. 8, 2021

(51) Int. Cl.
*G06F 21/10*  (2013.01)
*G06F 21/33*  (2013.01)

(52) U.S. Cl.
CPC ........ *G06F 21/335* (2013.01); *G06F 21/1062* (2023.08)

(58) Field of Classification Search
CPC . G06F 21/10; G06F 21/335; G06F 2221/0724
See application file for complete search history.

(56) References Cited

U.S. PATENT DOCUMENTS 6,332,193 B1 * 12/2001 Glass .................. H04L 63/0823
 713/170
9,076,048 B2    7/2015 Shubinsky
 (Continued)

FOREIGN PATENT DOCUMENTS

CN    1658225 A   8/2005
EP  3 432 162 A2  1/2019
(Continued)

OTHER PUBLICATIONS

PCT International Search Report dated Apr. 16, 2021 for PCT/US2021/012050.
(Continued)

*Primary Examiner* — David J Pearson
(74) *Attorney, Agent, or Firm* — Farjami & Farjami LLP

(57) ABSTRACT

A system for performing authentication of content based on intrinsic attributes includes a computing platform having a hardware processor and a memory storing a content authentication software code. The hardware processor executes the content authentication software code to receive a content file including digital content and authentication data created based on a baseline version of the digital content, to generate validation data based on the digital content, to compare the validation data to the authentication data, and to identify the digital content as baseline digital content in response to determining that the validation data matches the authentication data based on the comparison. The hardware processor is also configured to execute the content authentication software code to identify the digital content as manipulated digital content in response to determining that the validation data does not match the authentication data based on the comparison.

20 Claims, 4 Drawing Sheets

(56) References Cited

U.S. PATENT DOCUMENTS

| | | | |
|---|---|---|---|
| 9,167,174 B1* | 10/2015 | Rivard | H04N 23/741 |
| 10,102,526 B1 | 10/2018 | Madisetti et al. | |
| 10,255,724 B2 | 4/2019 | Barbaro | |
| 10,860,692 B1* | 12/2020 | Ur | H04L 65/605 |
| 11,449,584 B1* | 9/2022 | Pamucci | H04L 9/3247 |
| 11,469,904 B1* | 10/2022 | Kats | H04L 9/3297 |
| 2006/0132493 A1 | 6/2006 | Akima | |
| 2009/0157987 A1* | 6/2009 | Barley | G07F 7/08 711/E12.002 |
| 2010/0042615 A1* | 2/2010 | Rinearson | G06F 16/9535 707/E17.014 |
| 2012/0072493 A1* | 3/2012 | Muriello | G06Q 50/01 709/204 |
| 2012/0131002 A1 | 5/2012 | Rakshit | |
| 2012/0141093 A1 | 6/2012 | Yamaguchi et al. | |
| 2012/0266256 A1 | 10/2012 | Kawachiya et al. | |
| 2013/0006625 A1 | 1/2013 | Gunatilake et al. | |
| 2013/0124159 A1* | 5/2013 | Chen | H04N 23/843 703/2 |
| 2013/0216201 A1 | 8/2013 | Seligmann | |
| 2015/0101011 A1 | 4/2015 | Hutton | |
| 2015/0227869 A1 | 8/2015 | Saraf et al. | |
| 2015/0281258 A1 | 10/2015 | Watkins et al. | |
| 2015/0379253 A1 | 12/2015 | Cook et al. | |
| 2016/0034298 A1 | 2/2016 | Doane et al. | |
| 2016/0071541 A1 | 3/2016 | Miner | |
| 2016/0196852 A1* | 7/2016 | Sievert | G11B 27/102 386/241 |
| 2016/0292437 A1* | 10/2016 | Manmohan | G06F 21/6209 |
| 2016/0379330 A1* | 12/2016 | Powers | G06F 21/00 382/100 |
| 2017/0052676 A1 | 2/2017 | Pulier et al. | |
| 2017/0054708 A1 | 2/2017 | Zaw et al. | |
| 2017/0134162 A1* | 5/2017 | Code | G06F 21/10 |
| 2017/0262635 A1 | 9/2017 | Strauss et al. | |
| 2017/0264428 A1 | 9/2017 | Seger, II | |
| 2017/0308681 A1* | 10/2017 | Gould | H04L 63/08 |
| 2018/0091773 A1* | 3/2018 | Moussa | G06T 1/20 |
| 2018/0108024 A1 | 4/2018 | Greco et al. | |
| 2018/0121635 A1* | 5/2018 | Tormasov | H04L 9/3236 |
| 2018/0253567 A1* | 9/2018 | Gonzalez-Banos | H04N 21/8358 |
| 2018/0336656 A1 | 11/2018 | Powers et al. | |
| 2019/0057519 A1 | 2/2019 | Cinnamon et al. | |
| 2019/0102531 A1 | 4/2019 | Li et al. | |
| 2019/0130172 A1 | 5/2019 | Zhong et al. | |
| 2019/0253256 A1 | 8/2019 | Saab et al. | |
| 2019/0266650 A1 | 8/2019 | Chapman et al. | |
| 2019/0267041 A1 | 8/2019 | Ricciardi | |
| 2019/0304085 A1 | 10/2019 | Dekel-Klein et al. | |
| 2019/0324617 A1 | 10/2019 | Quail | |
| 2019/0347666 A1 | 11/2019 | Cisneros et al. | |
| 2019/0349204 A1* | 11/2019 | Enke | G06F 21/602 |
| 2020/0014816 A1* | 1/2020 | Speasl | H04N 1/32128 |
| 2020/0137440 A1* | 4/2020 | Zavesky | H04N 21/23418 |
| 2020/0162266 A1 | 5/2020 | Miller | |
| 2020/0184706 A1* | 6/2020 | Speasl | H04L 9/0643 |
| 2021/0029100 A1* | 1/2021 | Bendersky | H04L 63/0876 |
| 2021/0089683 A1* | 3/2021 | Hemlin Billstrom | H04L 9/3239 |
| 2021/0344498 A1* | 11/2021 | Perunov | H04L 9/0637 |
| 2021/0357533 A1* | 11/2021 | Britton | G06T 7/90 |

FOREIGN PATENT DOCUMENTS

| | | | | |
|---|---|---|---|---|
| JP | 2003-122726 A | 4/2003 | | |
| JP | 2008-192135 | 8/2008 | | |
| JP | 2008-294968 | 12/2008 | | |
| JP | 2019-534526 A | 11/2019 | | |
| KR | 10-2015-0096211 A | 5/2015 | | |
| KR | 10-2019-0042984 A | 4/2019 | | |
| WO | WO-03067850 A1 * | 8/2003 | | H04L 63/123 |
| WO | 2016/207899 A1 | 12/2016 | | |
| WO | 2019/020194 A1 | 1/2019 | | |
| WO | WO 2020/014286 A1 | 1/2020 | | |
| WO | WO 2020/003150 A2 | 2/2020 | | |
| WO | WO 2020/003150 A3 | 2/2020 | | |

OTHER PUBLICATIONS

PCT Written Opinion of the International Searching Authority dated Apr. 19, 2021 for PCT/US2021/012050.

PCT International Search Report dated Apr. 20, 2021 for PCT/US2021/012093.

PCT Written Opinion of the International Searching Authority dated Apr. 20, 2021 for PCT/US2021/012093.

PCT International Search Report dated Apr. 27, 2021 for PCT/US2021/012090.

PCT Written Opinion of the International Searching Authority dated Apr. 27, 2021 for PCT/US2021/012090.

PCT International Search Report dated Apr. 27, 2021 for PCT/US2021/012096.

PCT Written Opinion of the International Searching Authority dated Apr. 27, 2021 for PCT/US2021/012096.

U.S. Appl. No. 16/679,016, filed Nov. 8, 2019. "Chain-of-Manipulation Tracking of Audio-Video Content.".

Fingas, Jon. "Adobe, Twitter and the New York Times Team up to Fight Digital. Fakes." *Engadget*, Nov. 4, 2019, www.engadget.com/2019/11/04/adobe-twitter-nyt-digital-content-attribution/.

"Adobe, The New York Times Company and Twitter Announce Content Authenticity Initiative to Develop Industry Standard for Content Attribution." *Adobe Newsroom*, news.adobe.com/press-release/corporate/adobe-new-york-times-company-and-twitter-announce-content-authenticity.

Extended European Search Report in EP Application Serial No. 20197984.6.

"Digital video tempering detection: An overview of passive techniques" by Sitara et al. (Elsevier Ltd. 2016).

"Security Tip (ST04-018) Understanding Digital Signatures" (CISA 2009). (https://us-cert.cisa.gov/ncas/tips/ST04-018).

Extended European Search Report for EP Application 21738440.3 dated Dec. 12, 2023.

Falko Matern, Christian Riess, Marc Stamminger "Exploiting Visual Artifacts to Expose Deepfakes and Face Manipulations" 2019 IEEE Winter Applications of Computer Vision Workshops.

Extended European Search Report dated Jan. 25, 2024 for EP Application 21754551.6.

Pavel Korshunov and Sebastien Marcel "Vulnerability assessment and detection of Deepfake videos" 2019 International Conference on Biometrics (ICB), 6 Pgs.

Prabhat Kumar, Maynak Vatsa, Richa Singh "Detecting Face2Face Facial Reenactment in Videos" 2020 IEEE Winter Conference on Applications of Computer Vision (WACV), 9 Pgs.

Shruti Agarwal and Hany Farid "Protecting World Leaders Against Deep Fakes" IEEE/CVF Conference on Computer Vision and Pattern Recognition (CVPR) Workshops 2019, 8 Pgs.

Extended European Search Report dated Feb. 14, 2024 for EP Application 21743784.7.

Falko Matern, Christian Riess and Marc Stamminger "Exploiting Visual Artifacts to Expose Deepfakes and face Manipulations" 2019 IEEE Winter Applications of Computer Vision Workshops, 10 Pgs.

David Guerra and Erward J. Delp "Deepfake Video Detection Using Recurrent Neural Networks" 2018 IEEE International Conference on Advanced Video and Signal Based Surveillance (AVSS), 6 Pgs.

* cited by examiner

CONTENT AUTHENTICATION BASED ON INTRINSIC ATTRIBUTES

RELATED APPLICATION(S)

The present application is related to U.S. patent application Ser. No. 16/737,826, which issued as U.S. Pat. No. 10,951,958, titled "Authenticity Assessment of Modified Content," filed concurrently with the present application, and is hereby incorporated fully by reference into the present application.

BACKGROUND

Advances in machine learning have enabled the production of realistic but forged recreations of a person's image or voice, known as "deepfakes" due to the use of deep artificial neural networks for their creation. Deepfakes may be produced without the consent of the person whose image or voice is being used, and may make the person being represented appear to say or do something that they have in fact not said or done. As a result, deepfake manipulated digital content can be used maliciously to spread misinformation.

Due to the widespread popularity of digital content for the distribution of entertainment and news, the effective authentication and management of that content is important to its creators, owners and distributors alike. However, as machine learning solutions continue to improve, deepfakes are and will continue to be difficult to detect. As a result, subtly manipulated or even entirely fake digital content may inadvertently be broadcast or otherwise distributed in violation of contractual agreement or regulatory restrictions, thereby subjecting the content owners and/or distributors to potential legal jeopardy.

SUMMARY

There are provided systems and methods for performing authentication of content based on intrinsic attributes, substantially as shown in and/or described in connection with at least one of the figures, and as set forth more completely in the claims.

DETAILED DESCRIPTION

Figure 1:
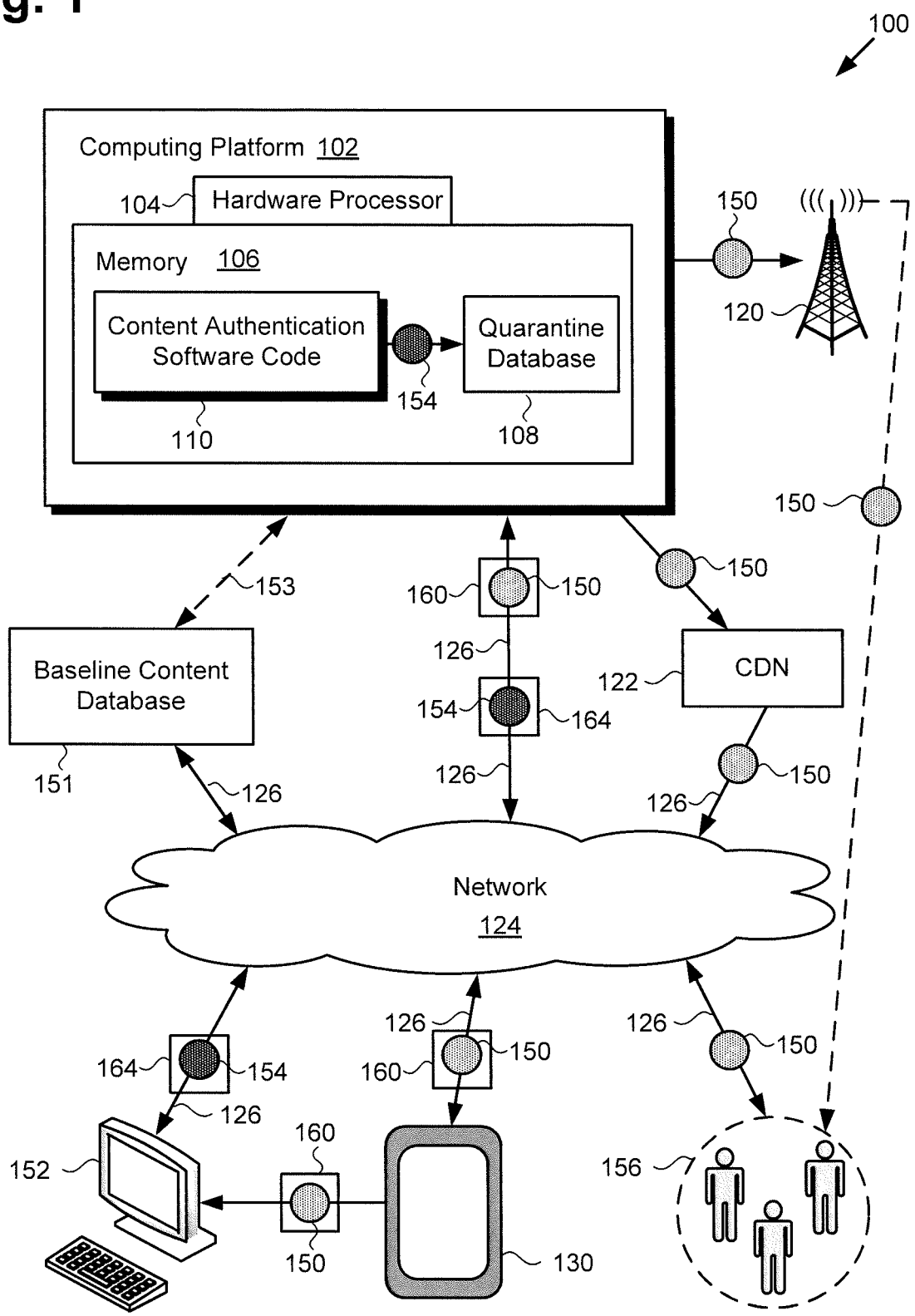
FIG. 1 shows a diagram of an exemplary system for performing authentication of content based on intrinsic attributes, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing authentication of content based on intrinsic attributes that overcome the drawbacks and deficiencies in the conventional art. By comparing validation data for received digital content to authentication data for that content created based on intrinsic attributes of the received digital content in its original or "baseline" version, the present authentication solution advantageously utilizes the characteristics of the digital content itself to uniquely identify it. In addition, by generating the validation data for comparison with the authentication data using the same cryptographic technique used to create the authentication data for the original or baseline digital content (hereinafter "baseline digital content"), the present application discloses a robust and substantially fool proof authentication solution.

It is noted that, in some implementations, the present content authentication solution may be performed as a substantially automated process by a substantially automated system. It is noted that, as used in the present application, the terms "automation," "automated", and "automating" refer to systems and processes that do not require the participation of a human user, such as a system administrator. Although, in some implementations, a human system operator or administrator may review the authentication determinations made by the automated systems and according to the automated methods described herein, that human involvement is optional. Thus, the methods described in the present application may be performed under the control of hardware processing components of the disclosed automated systems.

FIG. 1 shows a diagram of an exemplary system for performing authentication of content based on intrinsic attributes, according to one implementation. As shown in FIG. 1, system 100 can include computing platform 102 having hardware processor 104, and memory 106 implemented as a non-transitory storage device. According to the implementation shown in FIG. 1, memory 106 stores content authentication software code 110 and quarantine database 108 for storing digital content identified as manipulated digital content 154 by content authentication software code 110. It is noted that, as defined in the present application, the expression "manipulated digital content" refers to baseline digital content 150 that has undergone unauthorized modification subsequent to its legitimate production, for example by content production device 130.

As further shown in FIG. 1, system 100 is implemented within a use environment including content broadcast source 120, content distribution network (CDN) 122, baseline content database 151, and communication network 124 including network communication links 126. In addition, FIG. 1 shows content file 160 including baseline digital content 150 and content file 164 including manipulated digital content 154. Also shown in FIG. 1 are content production device 130 and content manipulation device 152 communicatively coupled to system 100 via communication network 124 and network communication links 126, as well as consumer audience 156 receiving baseline digital content 150.

Baseline content database 151 may be a centralized storage resource for substantially all baseline content evaluated for authenticity by system 100. As shown in FIG. 1, in some implementations, baseline content database 151 may be remote from computing platform 102, and may be communicatively coupled to computing platform 102 via communication network 124 and network communication links 126. However, in other implementations, as represented by direct communication link 153, baseline content database 151 may be a feature of system 100 or may be distinct from system 100 but be directly accessible to computing platform 102. That is to say, in various implementations, baseline content database 151 may be integrated with computing platform 102, may be a discrete resource directly accessible by computing platform 102, or may be remote from computing platform 102.

It is noted that, although the present application refers to content authentication software code 110 as being stored in memory 106 for conceptual clarity, more generally, memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is also noted that although FIG. 1 depicts content authentication software code 110 and quarantine database 108 as being co-located in memory 106, that representation is also provided merely as an aid to conceptual clarity. More generally, system 100 may include one or more computing platforms 102, such as computer servers for example, which may form an interactively linked but distributed system, such as a cloud-based system, for instance. As a result, hardware processor 104 and memory 106 may correspond to distributed processor and memory resources within system 100. In one implementation, for example, computing platform 102 of system 100 may correspond to one or more web servers, accessible over a packet-switched network such as the Internet. Alternatively, computing platform 102 may correspond to one or more computer servers supporting a wide area network (WAN), a local area network (LAN), or included in another type of limited distribution or private network.

By way of overview, system 100 is configured to receive content files including digital content, and to evaluate the authenticity of that digital content based on its intrinsic attributes using content authentication software code 110, executed by hardware processor 104. For example, system 100 may receive content file 160 including baseline digital content 150 legitimately produced by content production device 130, and/or may receive content file 164 including manipulated digital content 154, which may be a deepfake, for example, modified by content manipulation device 152 subsequent to its production as baseline digital content 150.

As a result of the evaluation of the digital content received by system 100 on the basis of the intrinsic attributes of the received content, as described in greater detail below, content authentication software code 110 may identify the received digital content as baseline digital content 150 or as manipulated digital content 154. When manipulated digital content 154 is identified, hardware processor may execute content authentication software code 110 to quarantine manipulated digital content 154 to prevent its distribution by content broadcast source 120 and/or CDN 122. For example, manipulated digital content 154 may be quarantined by being isolated in quarantine database 108.

Baseline digital content 150 may take the form of video content without audio, audio content without video, or audio-video content, such as a movie, episodic content that may include a television show series, a web series and/or a video log, sports content, news content, or video gaming content, to name a few examples. Alternatively, in some implementations, baseline digital content 150 may take the form of a digital photograph.

Where manipulation of digital content modifies video included in baseline digital content 150, the manipulation may include one or more of changing the contrast of a video frame, deleting a video frame, inserting a video frame, removing an object from a video frame, inserting an object into a video frame, changing colors within a video frame, or adding metadata to the frame, to name a few examples. Analogously, where manipulation modifies baseline digital content 150 in the form of a digital photograph, the manipulation may include one or more of changing an image property of the digital photograph (e.g., contrast, brightness, etc.), removing an object from the digital photograph, inserting an object into the digital photograph, changing colors within the digital photograph, or adding metadata to the digital photograph, again to name a few examples.

Where manipulation of digital content modifies audio content included in baseline digital content 150, such manipulation may include the deletion of a portion of original audio content and/or the insertion of additional audio content, such as music or speech, for example. Alternatively, or in addition, manipulation of audio content may include mixing audio tracks, changing the audio level of an audio track, or adding metadata to an audio track.

By contrast to the use case for manipulated digital content 154, when the digital content received by system 100 is identified as baseline digital content 150, hardware processor may execute content authentication software code 110 to output baseline digital content 150 to one or both of content broadcast source 120 and CDN 122 for distribution to consumer audience 156. Content broadcast source 120 may be a media entity providing video including baseline digital content 150. For example, baseline digital content 150 may be audio-video content included in a linear TV program stream provided by content broadcast source 120, for example, that includes a high-definition (HD) or ultra-HD (UHD) baseband video signal with embedded audio, captions, time code, and other ancillary metadata, such as ratings and/or parental guidelines. In some implementations, baseline digital content 150 distributed by content broadcast source 120 may also include multiple audio tracks, and may utilize secondary audio programming (SAP) and/or Descriptive Video Service (DVS), for example. Alternatively, or in addition, content broadcast source 120 may provide baseline digital content 150 via a radio or satellite radio broadcast.

Baseline digital content 150 distributed by content broadcast source 120 may be included in the same source video that is broadcast to a traditional TV audience, such as consumer audience 156. Thus, content broadcast source 120 may take the form of a conventional cable TV and/or satellite TV network, for example. As depicted in FIG. 1, in some implementations it may be advantageous or desirable to make baseline digital content 150 available via an alternative distribution channel, such as communication network 124, which may take the form of a packet-switched network, for example, such as the Internet, as noted above. For instance, system 100 may output baseline digital content 150 to CDN 122 for distribution to consumer audience 156 as part of a program stream, which may be an Internet Protocol (IP) program stream provided as part of a streaming service or video-on-demand (VOD) service.

It is noted that although FIG. 1 depicts content production device 130 as a mobile communication device, such as a smartphone or tablet computer, that representation is merely exemplary. More generally, content production device 130 may be any suitable system that implements data processing capabilities sufficient to provide a user interface, support connections to communication network 124, and implement the functionality ascribed to content production device 130 herein. In other implementations, content production device 130 may take the form of a digital still image camera, digital video camera, a desktop computer, a laptop computer, or a gaming console, to name a few examples. Analogously, although content manipulation device 152 is depicted as a desktop computer in FIG. 1, in other implementations, content manipulation device 152 may take the form of a smartphone, a tablet computer, a laptop computer, or a gaming console, to name a few examples.

Figure 2:
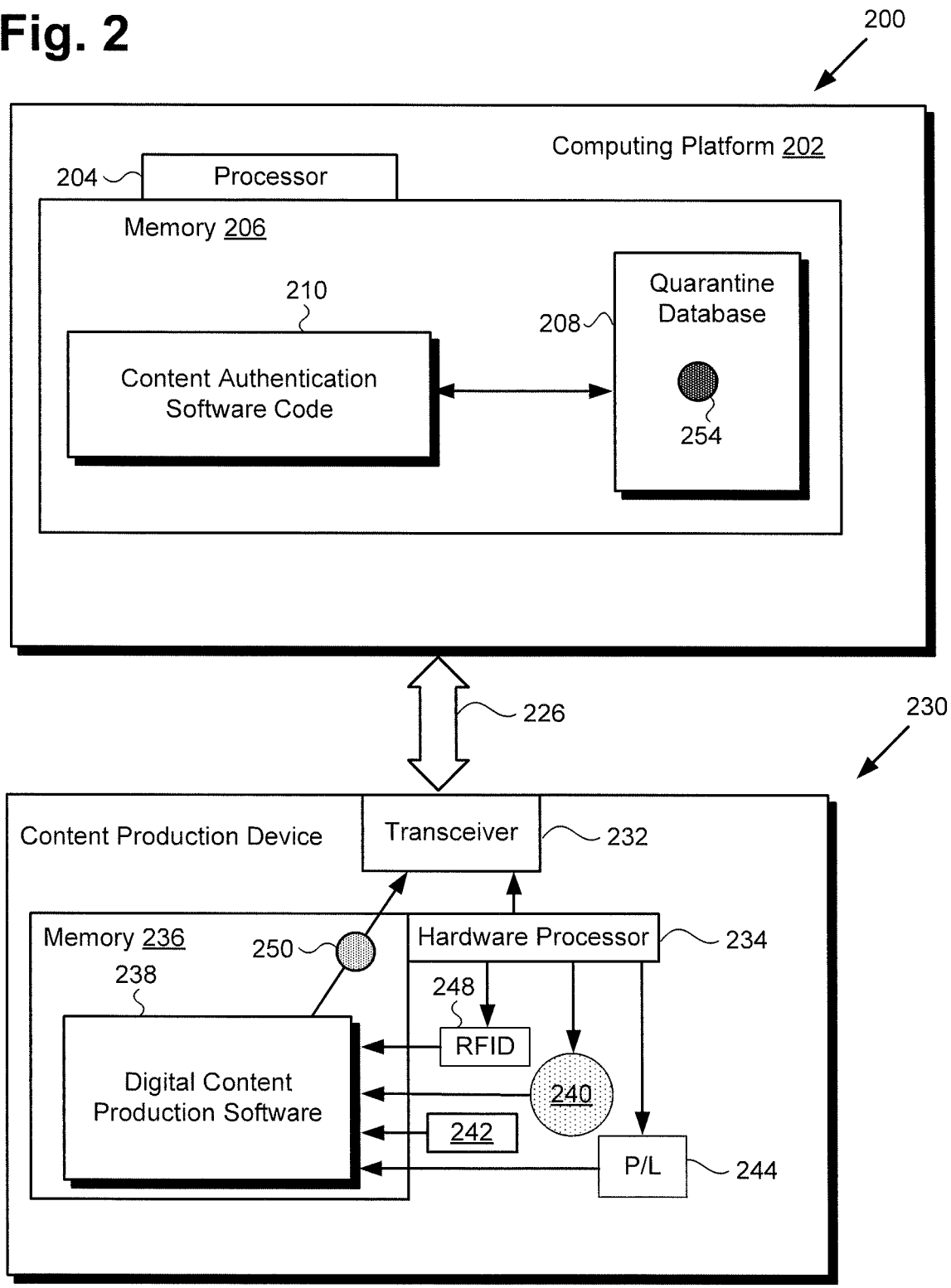
FIG. 2 shows another exemplary implementation of a system for performing authentication of content based on intrinsic attributes.

FIG. 2 shows another exemplary implementation of a system for performing authentication of content based on intrinsic attributes. According to the exemplary implementation shown in FIG. 2, content production device 230 is interactively connected to system 200 over network communication link 226. Network communication link 226, and system 200 including computing platform 202 having hardware processor 204 and memory 206 correspond in general to network communication links 126, and system 100 including computing platform 102 having hardware processor 104 and memory 106, in FIG. 1. Moreover, content authentication software code 210 and quarantine database 208 including manipulated digital content 254, in FIG. 2, correspond respectively in general to content authentication software code 110 and quarantine database 108 including manipulated digital content 154, in FIG. 1. Thus, quarantine database 208, manipulated digital content 254, and content authentication software code 210 may share any of the characteristics attributed to respective quarantine database 108, manipulated digital content 154, and content authentication software code 110 by the present disclosure, and vice versa.

As further shown in FIG. 2, content production device 230 includes hardware processor 234 and memory 236 implemented as a non-transitory storage device storing digital content production software 238. Hardware processor 234 may be the central processing unit (CPU) for content production device 230, for example, in which role hardware processor 234 runs the operating system for content production device 230 and executes digital content production software 238.

According to the exemplary implementation shown in FIG. 2, content production device 230 also includes transceiver 232, and one or more position/location sensors 244 (hereinafter "position/location sensor(s) 244"). Also shown in FIG. 2 are camera 240, acoustic sensor or sensors 242 (hereinafter "acoustic sensor(s) 242"), radio-frequency identification (RFID) reader 248, and baseline digital content 250 produced by content production device 230.

It is noted that inclusion in content production device 230 of the specific sensing components shown in FIG. 2 is merely exemplary. In some implementations, content production device 230 may include fewer than the sensing components shown in FIG. 2, while in some implementations, content production device 230 may include additional sensing components not shown in FIG. 2. For example, in some implementations, content production device 230 may omit RFID reader 248 and/or may include a Bluetooth or Bluetooth Low Energy (Bluetooth LE) transceiver, and/or may include a near-field communication (NFC) module, to name a few possible alternative sensing features.

Transceiver 232 may be implemented as a wireless communication unit enabling content production device 230 to exchange data with system 100/200 via communication network 124 and network communication link(s) 126/226. For example, transceiver 232 may be implemented as a fourth generation (4G) wireless transceiver, or as a 5G wireless transceiver configured to satisfy the IMT-2020 requirements established by the International Telecommunication Union (ITU). Position/location sensor(s) 244 may include one or more accelerometers, and/or gyroscopes, and/or a GPS receiver, and/or a magnetometer, for example. In some implementations, position/location sensor(s) 244 may be implemented as an inertial measurement unit (IMU), as known in the art. Camera 240 may include a still image camera and/or a video camera. Moreover, in some implementations, camera 240 may correspond to an array of still image and/or video cameras configured to generate panoramic images.

Content production device 230, in FIG. 2, corresponds in general to content production device 130, in FIG. 1. Thus, content production device 130 may share any of the characteristics attributed to content production device 230 by the present disclosure, and vice versa. That is to say, although not shown in FIG. 1, content production device 130 may include features corresponding respectively to transceiver 232, position/location sensor(s) 244, hardware processor 234, and memory 236 storing digital content production software 238, and may further include features corresponding respectively to camera 240, acoustic sensor(s) 242, and RFID reader 248.

Figure 3:
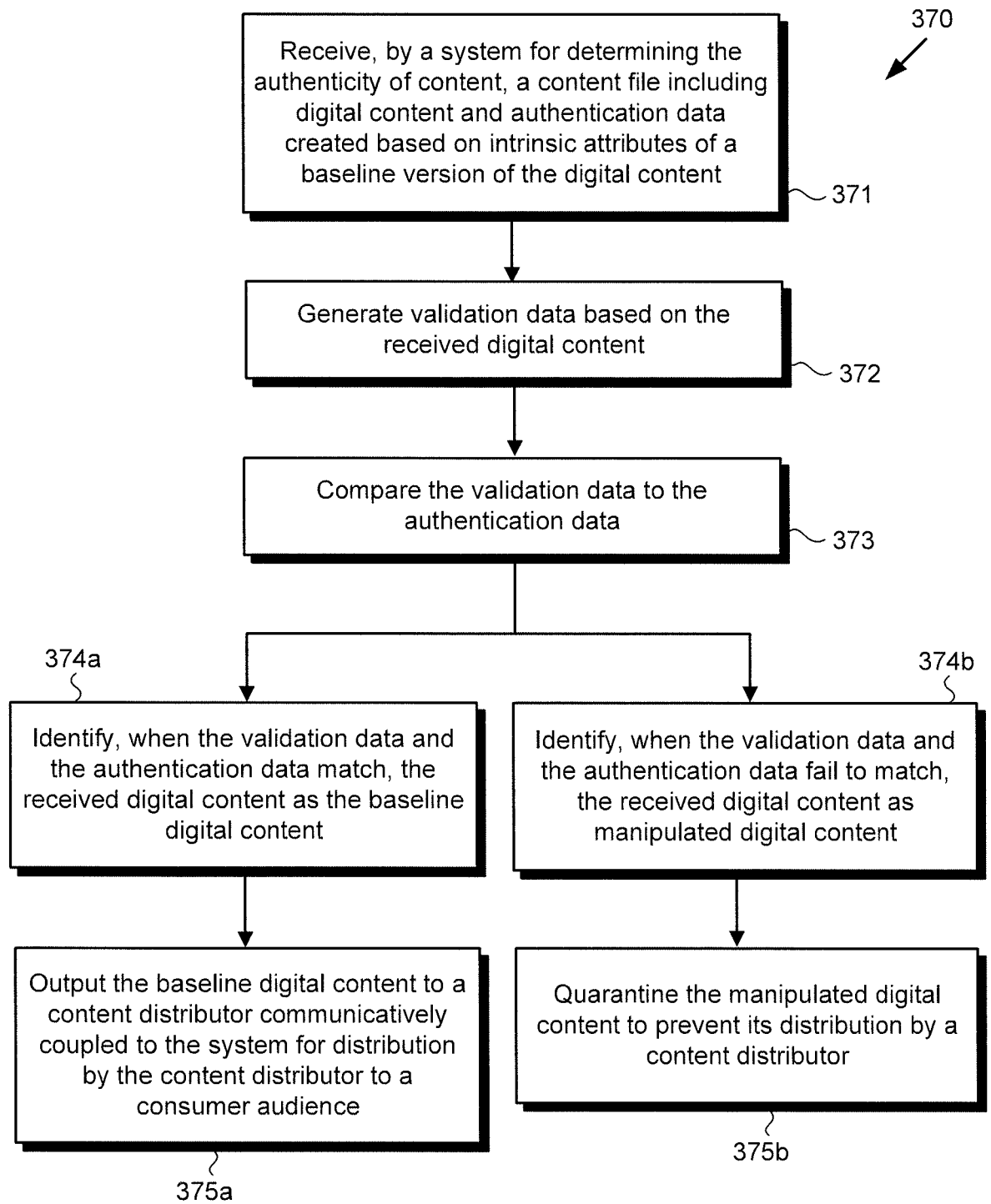
FIG. 3 is a flowchart presenting an exemplary method for use by a system to perform authentication of content based on intrinsic attributes, according to one implementation.

The functionality of content authentication software code 110/210 will be further described by reference to FIG. 3 in combination with FIGS. 1, 2, and 4. FIG. 3 shows flowchart 370 presenting an exemplary method for use by a system to perform authentication of content based on intrinsic attributes, according to one implementation. With respect to the method outlined in FIG. 3, it is noted that certain details and features have been left out of flowchart 370 in order not to obscure the discussion of the inventive features in the present application.

Figure 4:
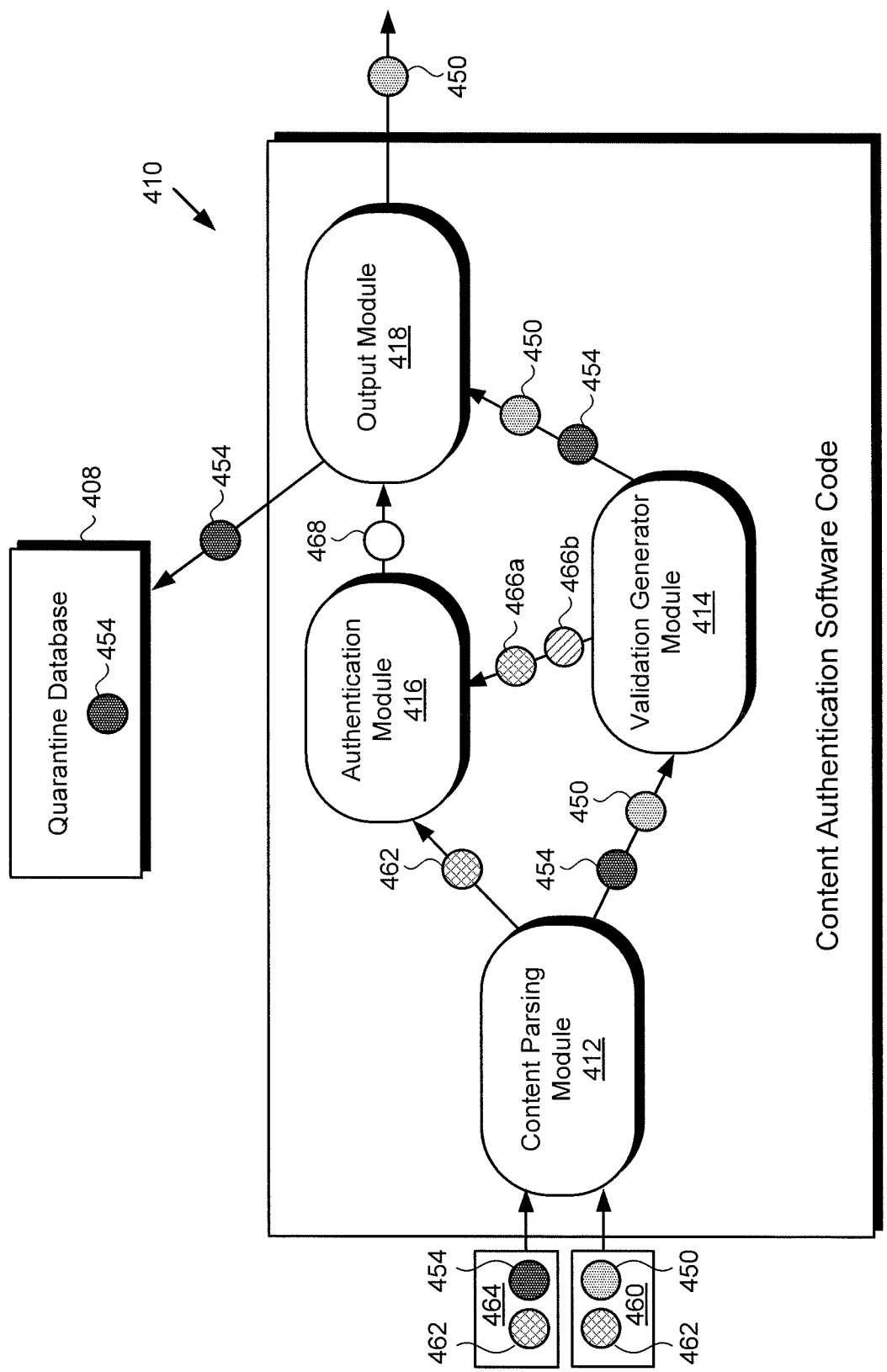
FIG. 4 shows an exemplary diagram of a content authentication software code suitable for execution by a hardware processor of the systems shown in FIGS. 1 and 2.

FIG. 4 shows an exemplary diagram of content authentication software code 410 suitable for execution by hardware processor 104/204 of system 100/200 shown by FIGS. 1 and 2, according to one implementation. As shown in FIG. 4, content authentication software code 410 may include content parsing module 412, validation generator module 414, authentication module 416, and output module 418. In addition, FIG. 4 shows content file 460 including baseline digital content 450 and authentication data 462 created based on intrinsic attributes of baseline digital content 450, as well as content file 464 including authentication data 462 and manipulated digital content 454 including one or more modifications to baseline digital content 450. Also shown in FIG. 4 are validation data 466a and/or 466b generated by validation generator module 414, content classification 468 output by authentication module 416, and quarantine database 408.

Baseline digital content 450, manipulated digital content 454, and quarantine database 408 correspond respectively in general to baseline digital content 150/250, manipulated digital content 154/254, and quarantine database 108/208 in FIGS. 1 and 2, and may share any of the characteristics attributed to those corresponding features by the present disclosure. Moreover, content file 460 and content file 464, in FIG. 4, correspond respectively in general to content file 160 and content file 164, in FIG. 1. Consequently, content file 160 and content file 164 may share any of the characteristics attributed to respective content file 460 and content file 464 by the present disclosure, and vice versa. That is to say, although not shown in FIG. 1, content file 160 may include authentication data 462 created based on intrinsic attributes of baseline digital content 450, in addition to baseline digital content 150, while content file 164 may include authentication data 462 in addition to manipulated digital content 154 including one or more modifications to baseline digital content 150.

Content authentication software code 410, in FIG. 4, corresponds in general to content authentication software code 110/210 in FIGS. 1 and 2. In other words, content authentication software code 110/210 may share any of the characteristics attributed to corresponding content authentication software code 410 by the present disclosure, and vice versa. Thus, like content authentication software code 410, content authentication software code 110/210 may include modules corresponding respectively to content parsing module 412, validation generator module 414, authentication module 416, and output module 418.

Referring to FIG. 3 in combination with FIGS. 1, 2, and 4, flowchart 370 begins with receiving, by system 100/200, a content file including digital content and authentication data, the authentication data created based on a baseline version of the digital content (action 371). There are a variety of use cases corresponding to action 371. For example, in one case, system 100/200 may receive content file 160/460 including baseline digital content 150/250/450 and authentication data 462 created based on intrinsic attributes of baseline digital content 150/250/450 from content production device 130/230.

The intrinsic attributes of baseline digital content 150/250/450 upon which authentication data 462 is based may include baseline digital content 150/250/450 itself, as well as specific features of baseline digital content 150/250/450, such as the size of baseline digital content 150/250/450 in bytes, and/or its data format, for example. Alternatively, or in addition, the intrinsic attributes of baseline digital content 150/250/450 upon which authentication data 462 is based may include metadata identifying the device identification (device ID) of content production device 130/230, the software application identification (application ID) of digital content production software 238 used to produce baseline digital content 150/250/450, and/or the identity of the user of content production device 130/230 (user ID). Furthermore, in some implementations, the intrinsic attributes of baseline digital content 150/250/450 upon which authentication data 462 is based may include metadata identifying the date on which baseline digital content 150/250/450 was produced, the time of that production, and/or the location of content production device 130/230 at the time of production, based for example on data recorded by acoustic sensor(s) 242, position/location sensor(s) 244, and/or RFID reader 248.

In yet other implementations, intrinsic attributes of baseline digital content 150/250/450 upon which authentication data 462 is based may include device IDs for other devices connected to content production device 130/230 when baseline digital content 150/250/450 was produced. In some implementations, some or all of the metadata describing the ID of content production device 130/230, the device IDs of other devices connected to content production device 130/230, the ID of the user of content production device 130/230, the time, and the location of content production device 130/230 may be transmitted by content production device 130/230 to a centralized authorization service providing an "OK to create content" authorization token. In implementations in which baseline digital content 150/250/450 includes video, for example, the authorization token could be hashed together with each frame of the video.

Any or all of the intrinsic attributes described above, including baseline digital content 150/250/450, may be hashed using any suitable cryptographic hash function, such as one of the Secure Hashtag Algorithm (SHA) family of hash functions, e.g., one of SHA-0, SHA-1, SHA-2, or SHA-3. Thus, authentication data 462 may include a hash value of baseline digital content 150/250/450 as well as some, all, or none of the additional intrinsic attributes of baseline digital content 150/250/450 described above.

In other use cases, system 100/200 may receive content file 164/464 including manipulated digital content 154/254/454 including one or more modifications to baseline digital content 150/250/450, from content manipulation device 152. It is noted that in implementations in which authentication data 462 takes the form of a hash value of baseline digital content 150/250/450 as well as some, all, or none of the additional intrinsic attributes of baseline digital content 150/250/450 described above, modification of baseline digital content 150/250/450 to produce manipulated digital content 154/254/454 will typically not alter authentication data 462. As a result, content file 164/464 including manipulated digital content 154/254/454 may also include authentication data 462 created based on intrinsic attributes of baseline digital content 150/250/450 in its original form, as shown in FIG. 4.

In one implementation, for example, a GPS check result and baseline digital content 150/250/450 may be hashed together. If a news station including system 100 receives unverified content, and its hash values do not match, the news station can determine that the unverified content either is not baseline digital content 150/250/450 or was not forwarded from a firsthand witness of the event depicted in the unverified content. Alternatively, or in addition, a clock check result can be hashed together with baseline digital content 150/250/450. If the news station receives unverified content, and its hash values do not match, the news station can determine that the unverified content either is not baseline digital content 150/250/450 or was not created at the time of the event depicted in the unverified content.

In some implementations, authentication data 462 may be appended to baseline digital content 150/250/450 and/or to manipulated digital content 154/254/454. For example, authentication data 462 may be appended as a "sidecar," as known in the art, to baseline digital content 150/250/450 and/or to manipulated digital content 154/254/454. However, in other implementations, it may be advantageous or desirable to embed authentication data 462 in baseline digital content 150/250/450. Embedding authentication data 462 in baseline digital content 150/250/450 may advantageously avoid stripping authentication data 462 from baseline digital content 150/250/450. Thus, in implementations in which authentication data 462 is embedded in baseline digital content 150/250/450, authentication data 462 may also be embedded in manipulated digital content 154/254/454.

Content file 160/460 including baseline digital content 150/250/450 and authentication data 462, and/or content file 164/464 including manipulated digital content 154/254/454 and authentication data 462 may be received by content parsing module 412 of content authentication software code 110/210/410, executed by hardware processor 104/204. Hardware processor 104/204 may further execute content authentication software code 110/210/410 to utilize content parsing module 412 to extract baseline digital content 150/250/450 from content file 160/460, and/or to extract manipulated digital content 154/254/454 from content file 164/464, for transfer of baseline digital content 150/250/450 and/or manipulated digital content 154/254/454 to validation generator module 414. In addition, content parsing module 412 may extract authentication data 462 from content file 160/460 and/or content file 164/464 for transfer to authentication module 416.

Flowchart 370 continues with generating validation data 466a based on baseline digital content 150/250/450 and/or generating validation data 466b based on the manipulated digital content 154/254/454 received in action 371 (action 372). In implementations in which authentication data 462 includes a hash value of baseline digital content 150/250/450, generation of validation data 466a based on baseline digital content 150/250/450 may include hashing baseline digital content 150/250/450 utilizing the same cryptographic hash function used to generate authentication data 462. Moreover, in those implementations, generation of validation data 466b based on manipulated digital content 154/254/454 may include hashing manipulated digital content 154/254/454 utilizing the same cryptographic hash function used to generate authentication data 462.

In implementation in which an "OK to create content" authorization token provided by a centralized authorization service is hashed with baseline digital content 150/250/450 to generate authentication data 462, hardware processor 104/204 may execute content authentication software code 110/210/410 to obtain the authorization token from the authorization service as part of action 372. In those implementations, the authorization token could be hashed with baseline digital content 150/250/450 to generate validation data 466a, or the authorization token could by hashed with manipulated digital content 154/254/454 to produce validation data 466b.

Validation data 466a and/or validation data 466b may be generated using validation generator module 414 of content authentication software code 110/210/410, executed by hardware processor 104/204. As shown in FIG. 4, after validation data 466a and/or validation data 466b is/are generated in action 372, validation data 466a and/or validation data 466b may be transferred from validation generator module 414 to authentication module 416 of content authentication software code 110/210/410.

Flowchart 370 continues with comparing validation data 466a and/or validation data 466b to authentication data 462 (action 373). For example, in implementations in which authentication data 462 includes a hash value of baseline digital content 150/250/450, validation data 466a includes a hash value of baseline digital content 150/250/450, and validation data 466b includes a hash value of manipulated digital content 153/254/454, action 373 may be performed by comparing the hash values. That is to say the hash value included in validation data 466a may be compared to the hash value included in authentication data 462, and/or the hash value included in validation data 466b may be compared to the hash value included in authentication data 462. Validation data 466a and/or validation data 466b may be compared to authentication data 462 by authentication module 416 of content authentication software code 110/210/410, executed by hardware processor 104/204.

In use cases in which content file 160/460 including baseline digital content 150/250/450 is received in action 371, validation data 466a matches authentication data 462. In those use cases, baseline digital content 150/250/450 is identified as such by authentication module 416 of content authentication software code 110/210/410, executed by hardware processor 104/204, in response to determining that validation data 466a matches authentication data 462 based on the comparison performed in action 373 (action 374a). By contrast, in use cases in which content file 164/464 including manipulated digital content 154/254/454 is received in action 371, validation data 466b fails to match authentication data 462. In those use cases, manipulated digital content 154/254/454 is identified as such by authentication module 416 of content authentication software code 110/210/410, executed by hardware processor 104/204, in response to determining that validation data 466b does not match authentication data 462 based on the comparison performed in action 373 (action 374b).

In some implementations, the exemplary method outlined by flowchart 370 may conclude with action 374a or action 374b described above. However, as shown in FIG. 3, in other implementations, action 374a may be followed by outputting baseline digital content 150/250/450 to a content distributor communicatively coupled to system 100/200 for distribution by the content distributor to consumer audience 156 (action 375a). For example, as shown in FIG. 1, in some implementations, baseline digital content 150/250/450 may be classified as such by content classification 468 and may be output to content broadcast source 120, which may be a cable TV or satellite TV network. Alternatively, or in addition, in some implementations, baseline digital content 150/250/450 may be output to CDN 122 for distribution of baseline digital content 150/250/450 as an IP stream. Action 375a may be performed by content authentication software code 110/210/410, executed by hardware processor 104/204, and using output module 418.

Alternatively, in implementations in which manipulated digital content 154/254/454 is identified as such in action 374b, flowchart 370 may continue with quarantining manipulated digital content 154/254/454 to prevent its distribution by a content distributor such as content broadcast source 120 or CDN 122 (action 375b). In those implementations, hardware processor 104/204 may execute content authentication software code 110/210/410 to use output module 418 to transfer digital content classified as manipulated digital content 154/254/454 based on content classification 468 to quarantine database 108/208/408 for isolation and storage.

It is noted that, in some implementations, hardware processor 104/204 may execute content authentication software code 110/210/410 to perform actions 371, 372, 373 (hereinafter "actions 371-373"), as well as subsequent actions 374a and/or 375a in an automated process from which human involvement may be omitted. Alternatively, or in addition, in some implementations hardware processor 104/204 may execute content authentication software code 110/210/410 to perform actions 371-373", 374b, and/or 375b in an automated process from which human involvement may be omitted.

Thus, the present application discloses systems and methods for performing authentication of content based on intrinsic attributes that overcome the drawbacks and deficiencies in the conventional art. As discussed above, by comparing validation data for received digital content to authentication data for that content created based on intrinsic attributes of the received content in its original or baseline version, the present authentication solution advantageously utilizes the characteristics of the digital content itself to uniquely identify it. In addition, by generating the validation data for comparison with the authentication data using the same cryptographic technique used to create the authentication data for the baseline digital content, the present application discloses a robust and substantially fool proof authentication solution.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a computing platform including a hardware processor and a system memory;
a content authentication software code stored in the system memory;
the hardware processor being configured to execute the content authentication software code to:
receive, from a single source, a content file including digital content and authentication data, the authentication data created using a baseline version of the digital content and an authorization token provided by an authorization service based on baseline metadata describing at least one intrinsic attribute of the baseline version of the digital content, wherein the at least one intrinsic attribute of the baseline version of the digital content includes a user ID of a producer of the baseline version of the digital content;
obtain the authorization token from the authorization service;
generate validation data using the digital content and the authorization token, wherein generating the validation data comprises hashing the authorization token with the digital content to determine a hash value corresponding to the digital content;
compare the validation data to the authentication data;
identify the digital content as an authenticated digital content, in response to determining that the validation data matches the authentication data based on the comparing; and
identify the digital content as a manipulated digital content, in response to determining that the validation data does not match the authentication data based on the comparing.

2. The system of claim 1, wherein the at least one intrinsic attribute of the baseline version of the digital content further includes one or more of:
a size of the baseline version of the digital content,
a data format of the baseline version of the digital content,
a date the baseline version of the digital content was produced,
a software application identification of a software application that produced the baseline version of the digital content, or
a location where the baseline version of the digital content was produced.

3. The system of claim 1, wherein the hardware processor is configured to further execute the content authentication software code to output the authenticated digital content to a content distributor communicatively coupled to the system for distribution by the content distributor to a consumer audience, and wherein the content distributor is configured to distribute the authenticated digital content through at least one of a cable television (TV) network, a satellite TV network or an Internet Protocol (IP) stream.

4. The system of claim 1, wherein the hardware processor is configured to further execute the content authentication software code to quarantine the manipulated digital content to prevent distribution of the manipulated digital content.

5. The system of claim 1, wherein the authentication data is appended to the digital content.

6. The system of claim 1, wherein the authentication data is embedded in the digital content.

7. The system of claim 1, wherein the digital content comprises at least one of a digital image, a video content or an audio content.

8. The system of claim 1, wherein the at least one intrinsic attribute of the baseline version of the digital content further includes a first device identification of a first device that produced the baseline version of the digital content and a second device identification of at least one other device connected to the first device when the baseline version of the digital content was produced by the first device.

9. The system of claim 1, wherein the at least one intrinsic attribute of the baseline version of the digital content further includes a software application identification of a software application that produced the baseline version of the digital content.

10. The system of claim 1, wherein the digital content comprises a video, and wherein generating the validation data comprises hashing the authorization token with each frame of the video.

11. The system of claim 1, wherein the authorization token comprises a token authorizing production of the baseline version of the digital content by a content production device.

12. A method for use by a system including a computing platform having a hardware processor and a system memory storing a content authentication software code, the method comprising:
receiving, from a single source, by the content authentication software code executed by the hardware processor, a content file including digital content and authentication data, the authentication data created using a baseline version of the digital content and an authorization token provided by an authorization service based on baseline metadata describing at least one intrinsic attribute of the baseline version of the digital content, wherein the at least one intrinsic attribute of the baseline version of the digital content includes a user ID of a producer of the baseline version of the digital content;
obtaining, by the content authentication software code executed by the hardware processor, the authorization token from the authorization service;
generating, by the content authentication software code executed by the hardware processor, validation data using the digital content and the authorization token, wherein generating the validation data comprises hashing the authorization token with the digital content to determine a hash value corresponding to the digital content;

comparing, by the content authentication software code executed by the hardware processor, the validation data to the authentication data;

identifying the digital content as an authenticated digital content, by the content authentication software code executed by the hardware processor, in response to determining that the validation data matches the authentication data based on the comparing; and identifying the digital content as a manipulated digital content, by the content authentication software code executed by the hardware processor, in response to determining that the validation data does not match the authentication data based on the comparing.

13. The method of claim 12, wherein the at least one intrinsic attribute of the baseline version of the digital content further includes one or more of:

a size of the baseline version of the digital content, a data format of the baseline version of the digital content, a date the baseline version of the digital content was produced, a software application identification of a software application that produced the baseline version of the digital content, or a location where the baseline version of the digital content was produced.

14. The method of claim 12, further comprising:

outputting the authenticated digital content to a content distributor communicatively coupled to the system for distribution by the content distributor to a consumer audience, wherein the content distributor is configured to distribute the authenticated digital content through at least one of a cable television (TV) network, a satellite TV network or an Internet Protocol (IP) stream.

15. The method of claim 12, further comprising, quarantining the manipulated digital content, by the content authentication software code executed by the hardware processor, to prevent distribution of the manipulated digital content.

16. The method of claim 12, wherein the authentication data is appended to the digital content.

17. The method of claim 12, wherein the authentication data is embedded in the digital content.

18. The method of claim 12, wherein the received digital content comprises at least one of a digital image, a video content or an audio content.

19. The method of claim 12, wherein the digital content comprises a video, and wherein generating the validation data comprises hashing the authorization token with each frame of the video.

20. The method of claim 12, wherein the authorization token comprises a token authorizing production of the baseline version of the digital content by a content production device.

* * * * *